M. NYSTROM.
SPEED INDICATOR.
APPLICATION FILED NOV. 16, 1916.
1,223,896.
Patented Apr. 24, 1917.
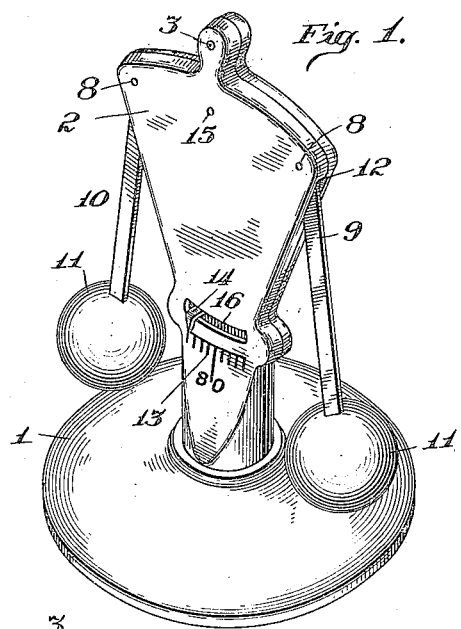
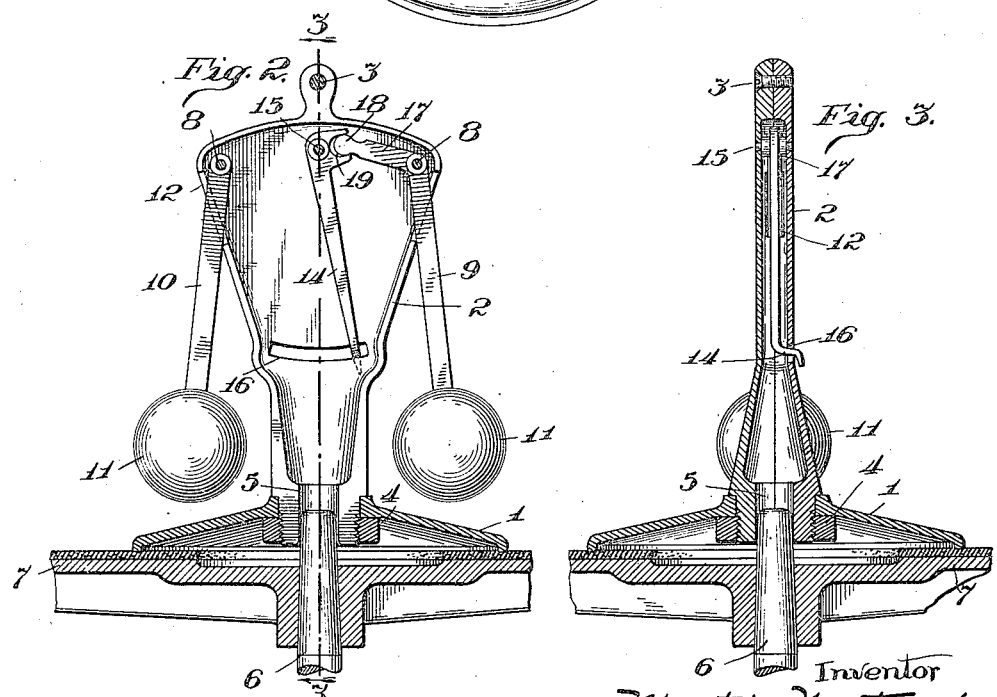
Inventor
Martin Nystrom

UNITED STATES PATENT OFFICE.

MARTIN NYSTROM, OF CHICAGO, ILLINOIS, ASSIGNOR TO THE BRUNSWICK-BALKE-COLLENDER COMPANY, OF CHICAGO, ILLINOIS, A CORPORATION OF DELAWARE.

SPEED-INDICATOR.

1,223,896.  Specification of Letters Patent.  Patented Apr. 24, 1917.

Application filed November 16, 1916. Serial No. 131,622.

*To all whom it may concern:*

Be it known that I, MARTIN NYSTROM, a citizen of the United States, residing at Chicago, in the county of Cook and State of Illinois, have invented certain new and useful Improvements in Speed-Indicators, of which the following is a specification.

This invention relates to a speed indicator for talking machine record tables.

Talking machines are commonly provided with governors and regulating means to vary the speed of rotation of the record table to correspond to the speed at which the record groove was originally cut. This varies in records of different manufacture and not infrequently in those of the same manufacture and it is essential if the best results are to be obtained that the speed of rotation of the table be accurately determined. The indicators provided on talking machines are frequently inaccurate and, therefore, can not be relied upon.

It is the object of my invention to provide an independent speed indicator of simple and inexpensive character whereby the actual speed of rotation of the record table may be quickly and accurately determined.

Further objects and advantages of my invention will be apparent as it is better understood by reference to the following specification when read in connection with the accompanying drawing, illustrating the preferred embodiment thereof, in which—

Figure 1 is a view in perspective of an indicator according to my invention;

Fig. 2 is a vertical section through the indicator illustrating the operating mechanism therefor, and Fig. 3 is a section on the line 3—3 of Fig. 2.

Referring to the drawing, 1 indicates a base adapted to support the standard 2 which is preferably constructed in two parts, as indicated in Fig. 3, secured together by a screw 3. The standard 2 may be secured to the base 1 in any suitable manner as for example by the threaded collar 4. An axial opening 5 is provided to receive the spindle 6 of the talking machine which projects above the record table 7.

Mounted on suitable pivot pins 8 in the standard 2 are a pair of arms 9 and 10, each provided with a weight 11 at its extremity. The arms 9 and 10 project through suitable openings 12 in the standard 2 so that they may swing readily about the pivot pins 8.

A scale 13 is provided upon the face of the standard 2 and an indicator 14 is pivotally mounted at 15 in the standard 2 and projects through an opening 16 in the face thereof to coöperate with the scale 13. An extension 17 of the arm 9 is provided with a rounded end 18 coöperating with a socket 19 on the indicator 14 thus forming an operating connection between the arm 9 and the indicator.

The mode of operation of my invention will be apparent from the following brief description thereof. The indicator is arranged upon the record table with the spindle 6 disposed in the axial opening 5. Power is then applied in the usual manner to the spindle 6 to rotate the record table 7 whereupon the weights 11 are moved automatically by centrifugal force, the amount of movement depending upon the rate of speed of rotation of the record table 7. The connection between the arm 9 and the indicator 14 causes the latter to move over the scale 13 to accurately indicate the speed of rotation of the record table.

From the foregoing it will be readily apparent that I have perfected a simple device, embodying a minimum of inexpensive parts, which may be quickly applied to the record table of a talking machine to determine exactly the speed of rotation. If the indicated speed is not that desired for the particular record the mechanism of the talking machine may be adjusted to rotate the record table 7 at the desired speed.

It will be apparent that various changes may be made in the form, construction and arrangement of the parts without departing from the spirit and scope of the invention or sacrificing any of its material advantages, the form hereinbefore described being merely a preferred embodiment thereof.

I claim:

A speed indicator for talking machine record tables comprising a base having an axial opening to receive the spindle of a talking machine, a hollow standard supported on said base having a slot in one face and a scale contiguous to said slot, an indicator pivotally mounted within said standard with its end projecting through said slot, and a pair of weighted arms pivotally mounted on said standard, one of said arms having an extension engaging said indicator.

MARTIN NYSTROM.

Witnesses:
M. D. HENDRICKSON,
N. W. CUMMINGS.